United States Patent
Koutsky et al.

[19]

[11] Patent Number: 6,059,253
[45] Date of Patent: May 9, 2000

[54] ACTIVE SUSPENSION SYSTEM FOR VEHICLE SEATS

[75] Inventors: L. John Koutsky, Milan, Ill.; Cole T. Brodersen, Davenport, Iowa

[73] Assignee: Sears Manufacturing Company, Davenport, Iowa

[21] Appl. No.: 08/649,945

[22] Filed: May 14, 1996

[51] Int. Cl.[7] .................................................. F16M 13/00
[52] U.S. Cl. .......................................................... 248/550
[58] Field of Search ................................. 248/550, 138, 248/395, 394, 393, 418, 425, 631, 583; 180/282; 73/652; 318/648

[56] References Cited

U.S. PATENT DOCUMENTS

| | | |
|---|---|---|
| 3,701,499 | 10/1972 | Schubert et al. ............... 248/550 X |
| 3,951,373 | 4/1976 | Swenson et al. ............... 248/550 |
| 4,198,025 | 4/1980 | Lowe et al. .................... 248/550 |
| 4,363,377 | 12/1982 | Van Gerpen . |
| 4,477,050 | 10/1984 | Thompson et al. . |
| 4,669,710 | 6/1987 | Horvat . |
| 4,962,946 | 10/1990 | Wright . |
| 5,044,455 | 9/1991 | Tecco et al. . |
| 5,131,611 | 7/1992 | Vollaro ........................... 248/550 X |
| 5,169,112 | 12/1992 | Boyles et al. .................. 248/550 |
| 5,176,355 | 1/1993 | Carter ............................. 248/550 |
| 5,294,085 | 3/1994 | Lloyd et al. .................... 248/550 X |
| 5,305,981 | 4/1994 | Cunningham et al. ......... 248/550 |
| 5,348,124 | 9/1994 | Harper ........................... 248/550 X |
| 5,536,059 | 7/1996 | Amirouche . |
| 5,555,501 | 9/1996 | Furihata et al. . |
| 5,570,866 | 11/1996 | Stephens ........................ 248/550 X |
| 5,582,385 | 12/1996 | Boyles et al. .................. 248/550 |

FOREIGN PATENT DOCUMENTS

| | | |
|---|---|---|
| 0579182A1 | 7/1993 | European Pat. Off. . |
| 2757661 | 6/1979 | Germany ......................... 248/550 |
| 2025572 | 7/1979 | United Kingdom . |
| 2071810 | 9/1981 | United Kingdom . |

OTHER PUBLICATIONS

Implement & Tractor, Curing The Tractor Seat Shakes: How.
Presentation at 1973 Annual Meeting of American Society of.
Presentation at 1968 Winter Meeting of American Society of.
Drawings of vehicle ride simulator, McFadden Systems Inc.
UIC News, Oct. 31, 1994 article.
Business Week, "Smart Car Seats That Meet Potholes Halfway".
UIC News, Engineer's Device Helps Truckers Sit Tall In The.
Coventry Univ. Sch. of Engineering "Project report for BEng Honours Degree in Medical Engineering—The Development of an active suspension seat" by S.F.J. Morgan 1993.

*Primary Examiner*—Anita M. King
*Attorney, Agent, or Firm*—Niro, Scavone, Haller & Niro

[57] ABSTRACT

An active suspension system for limiting movement of a vehicle seat in two or more directions, up to and including six directions, in response to vehicle movement. The active suspension system includes seat actuating members and sensors for monitoring movement of the vehicle and/or the vehicle seat, and the seat actuating members. The seat actuating members also function to provide mechanical support for the vehicle seat. A control system accepts feedback from the sensors and responsively directs movement of the seat actuating members to limit seat movement in response to vehicle movement. A method for using an active suspension system to limit seat movement in response to vehicle movement also forms part of the present invention.

33 Claims, 7 Drawing Sheets

ACTIVE SUSPENSION SYSTEM FOR VEHICLE SEATS

BACKGROUND OF THE INVENTION

This invention generally relates to an active suspension system for a vehicle seat. More particularly, the invention relates to such a suspension system that can compensate for vehicle movement by controlling seat movement in six separate directions.

Conventional vehicle seat suspension systems typically control movement of the seat in a vertical direction using mechanical or electromechanical damping systems. Such systems typically employ secondary linkage systems, such as a scissors or parallelogram linkages, to provide structural support for the seat, separate and apart from the main suspension system designed to compensate for vertical movement. Shock absorbers and/or springs are also typically used to attempt to attenuate or dampen seat movement in horizontal or vertical directions.

Active seat suspension systems differ from the more common passive systems described above in that an active system responds to vehicle motion by actively moving the vehicle seat in a direction(s) and by an amount sufficient to compensate for vehicle motion. Thus, the goal of an active seat suspension system is to keep the vehicle seat "motionless" in terms of movement experienced by the seated operator.

No known active seat suspension system attempts to control seat movement, in two or more directions, in response to vehicle movement. Nor are any such systems known in which the seat actuating members also function as a structural support for the vehicle seat, allowing a low profile suspension system. Such an active suspension system for vehicle seats would substantially improve an operator's seating comfort, and would be usable within the often cramped confines of a vehicle cab.

Accordingly, it is an object of the present invention to provide an active suspension system that will actively move a vehicle seat in more than one direction in response to vehicle movement.

It is another object of the present invention to provide movement actuators which function in a dual capacity as both a structural support for the seat and as an active suspension system for the seat.

It is still another object of the present invention to provide a vehicle seat suspension system that does not require a secondary linkage system to support the seating load and/or to stabilize it.

It is still a further object to provide a low profile, active suspension system for a vehicle seat.

It is yet another object of the present invention to provide an active suspension system for a vehicle seat using multiple seat actuating members in which each of the actuating members participates in any vehicle seat movement.

SUMMARY OF THE INVENTION

These and other objects are realized by the present invention, which overcomes the disadvantages of conventional seat suspension systems and provides new advantages not found in such systems.

The present invention is directed to an active suspension system for limiting movement of a vehicle seat relative to a vehicle. The invention includes a plurality of seat actuating members associated with the vehicle seat, for moving the seat in two or more directions with respect to the vehicle. The seat actuating members also provide some or all of the mechanical support for the vehicle seat. Sensors are used to monitor movement of the vehicle and the seat actuating members. Alternatively, the sensors could monitor movement of the vehicle seat and the seat actuating members (which might be accomplished in an indirect manner). A control system directs movement of the seat actuating members in response to feedback from the sensors, thereby limiting seat movement in response to vehicle movement. Preferably, a "low profile" suspension system is employed which has a height of less than about one foot.

In a particularly preferred embodiment, the seat actuating members of the active suspension system can move the vehicle seat in any one or more of six directions, including vertical, lateral, fore-and-aft, roll, pitch and yaw directions. Also, a secondary mechanical support system, such as one or more air springs, can be used if desired to aid the seat actuating members in mechanically supporting the vehicle seat.

In one embodiment, the control system can include a microprocessor electrically connected to the seat movement actuators and to the sensors. Voltage detectors are employed for monitoring movement of the seat actuating members. The sensors may include linear variable displacement transducers and/or accelerometers, or other sensing means known to those of skill in the art.

In the preferred embodiment, the seat actuating members consist of six hydraulic cylinders which are connected to upper and lower rigid frames. The upper frame is rigidly connected to the vehicle seat, while the lower frame can be rigidly connected to the floor of the vehicle cab. Instead of hydraulic cylinders, the seat actuating members could take various other forms, including air cylinders or linear actuators (such as a motor and drive screws). The seat actuating members could also be electromagnetically powered.

In a preferred embodiment, the control system temporarily disables the seat actuating members and causes them to remain in predetermined positions when the vehicle encounters extreme movement conditions, as those conditions are predetermined by the control system. During such extreme movement conditions of the vehicle, a secondary, passive vehicle seat support system (such as one that employs air springs) can be activated or can continue to operate.

In an alternative embodiment, the active suspension system of the present invention is used to suspend a vehicle cab. The seat actuating members are sized to function as cab actuating members for controlling movement of the cab with respect to the vehicle. The cab actuating members can also provide mechanical support for the vehicle cab, although secondary mechanical supports (such as air springs or other supports) can also be used. Again, a plurality of sensors for monitoring movement of the vehicle and the cab actuating members (or, alternatively, the vehicle cab and the cab actuating members) are employed. A control system is also used to direct movement of the cab actuator members in response to feedback from the sensors, to thereby limit cab movement in response to vehicle movement.

A method for using the active suspension system to limit vehicle seat or vehicle cab movement also forms part of the present invention. With regard to a vehicle seat, the invention includes the steps of providing seat actuating members for controlling movement of the vehicle seat with respect to the vehicle (and/or for providing mechanical support for the vehicle seat); providing sensors for monitoring movement of the vehicle and the seat actuating members (and/or the vehicle seat and the seat actuating members); and providing a control system for accepting movement feedback from the sensors, processing the sensor feedback, and responsively directing the seat actuating members to limit seat movement in response to vehicle movement.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DETAILED DESCRIPTION OF THE PREFERRED EMBODIMENTS

The active suspension system of the present invention can be used to control vehicle seat movement in any direction, compensating for vehicle movement and thereby providing a vehicle ride which, within the control parameters of the system, can be extremely smooth, with little or no movement of the vehicle seat relative to the ground. To accomplish this, a novel suspension system configuration is used and employs seat actuating members, which serve both as a structural support for the vehicle seat, and simultaneously provide ride characteristics in the form of compensating movement to the vehicle seat in response to vehicle movement. Movement sensors associated with the vehicle and/or the vehicle seat, and position sensors associated with the seat actuating members, are used to continuously monitor movement of the vehicle, the vehicle seat, and the seat actuating members. A controller automatically processes information transmitted from the sensors, and sends control signals to the actuator system to provide compensating movement of the vehicle seat in a continuous process.

Figure 1:
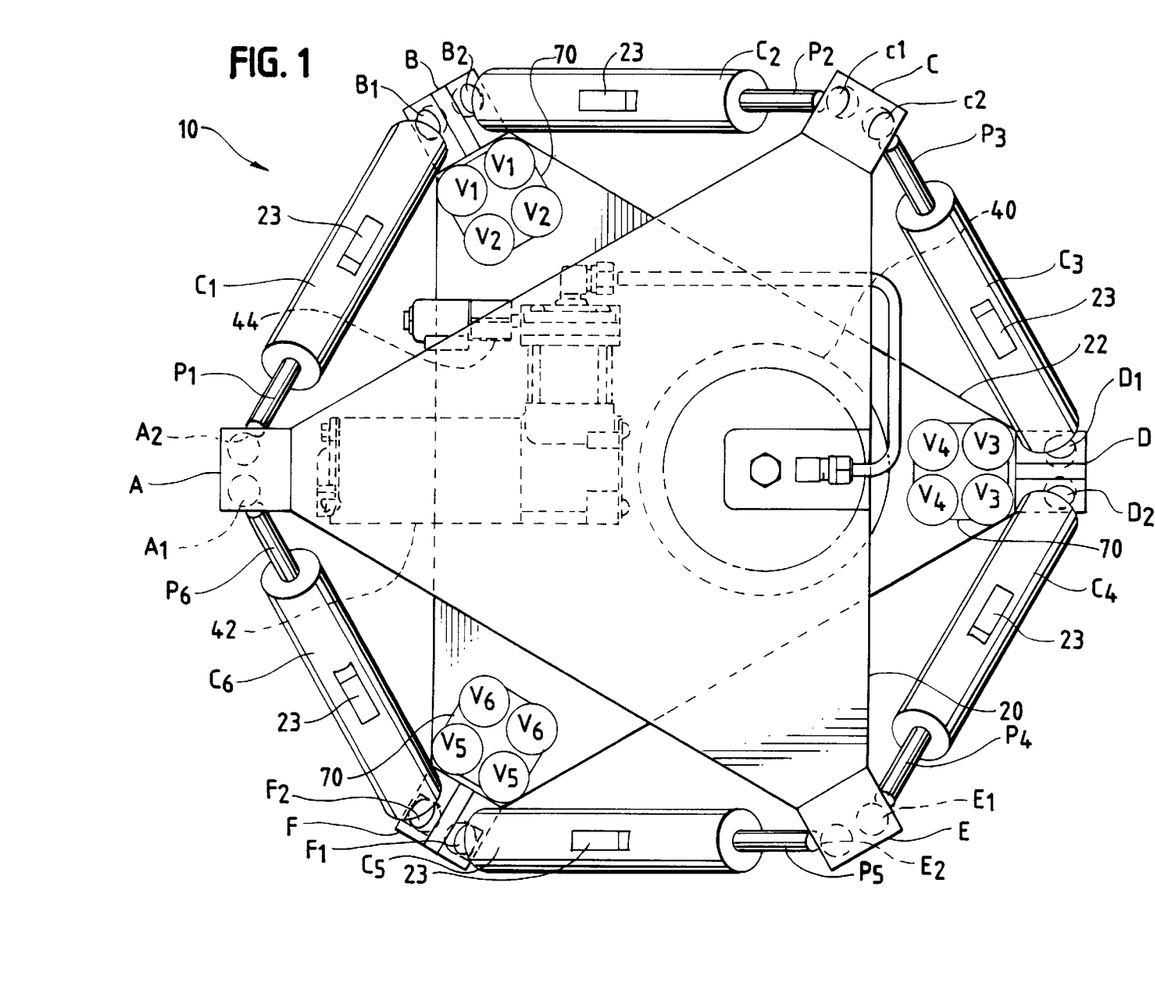
FIG. 1 is a top view, in partial cross-section, of the seat actuating members employed in a preferred embodiment of the active suspension system of the present invention.
Figure 2:
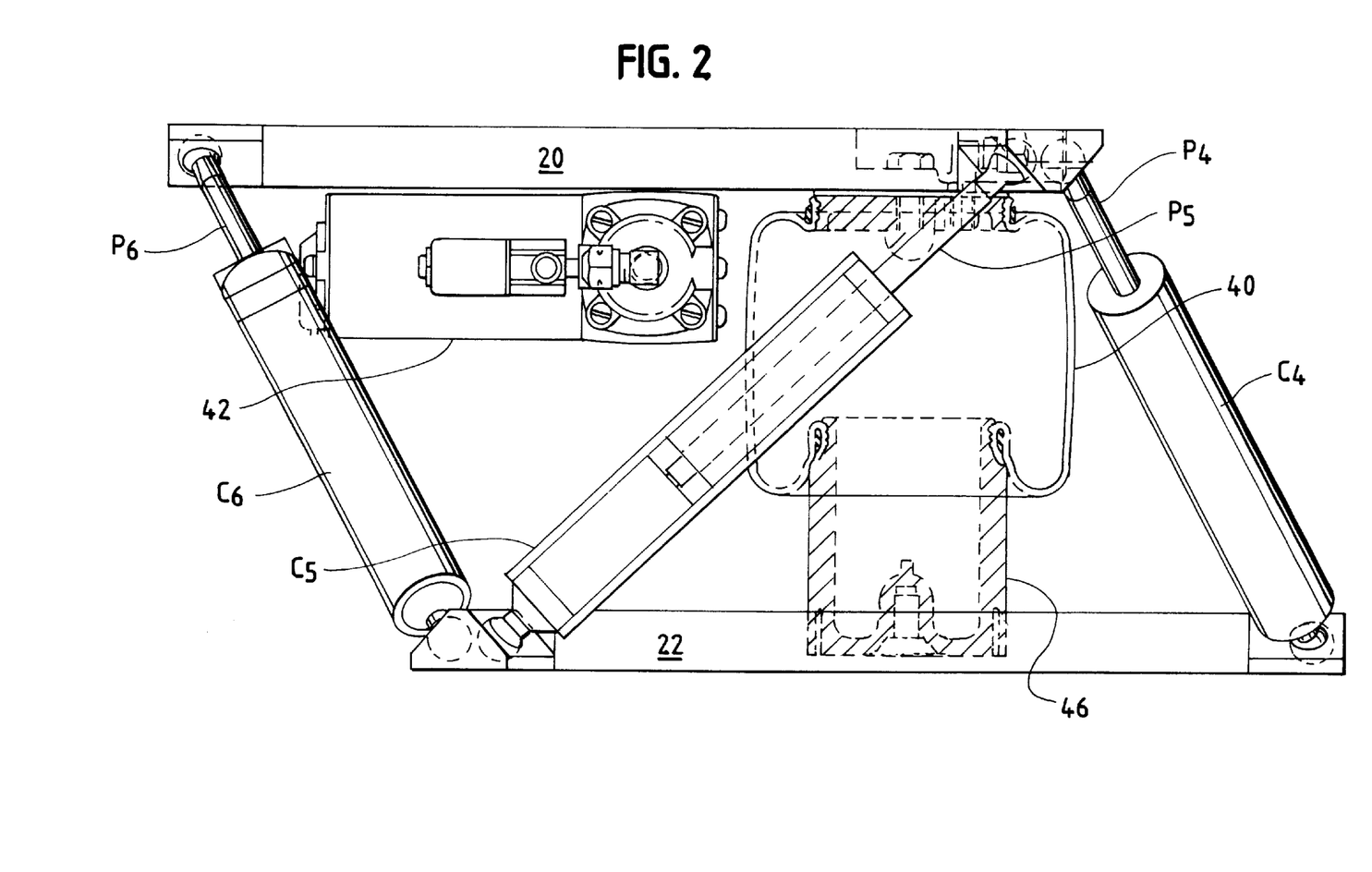
FIG. 2 is a side view, in partial cross-section, of FIG. 1.
Figure 3:
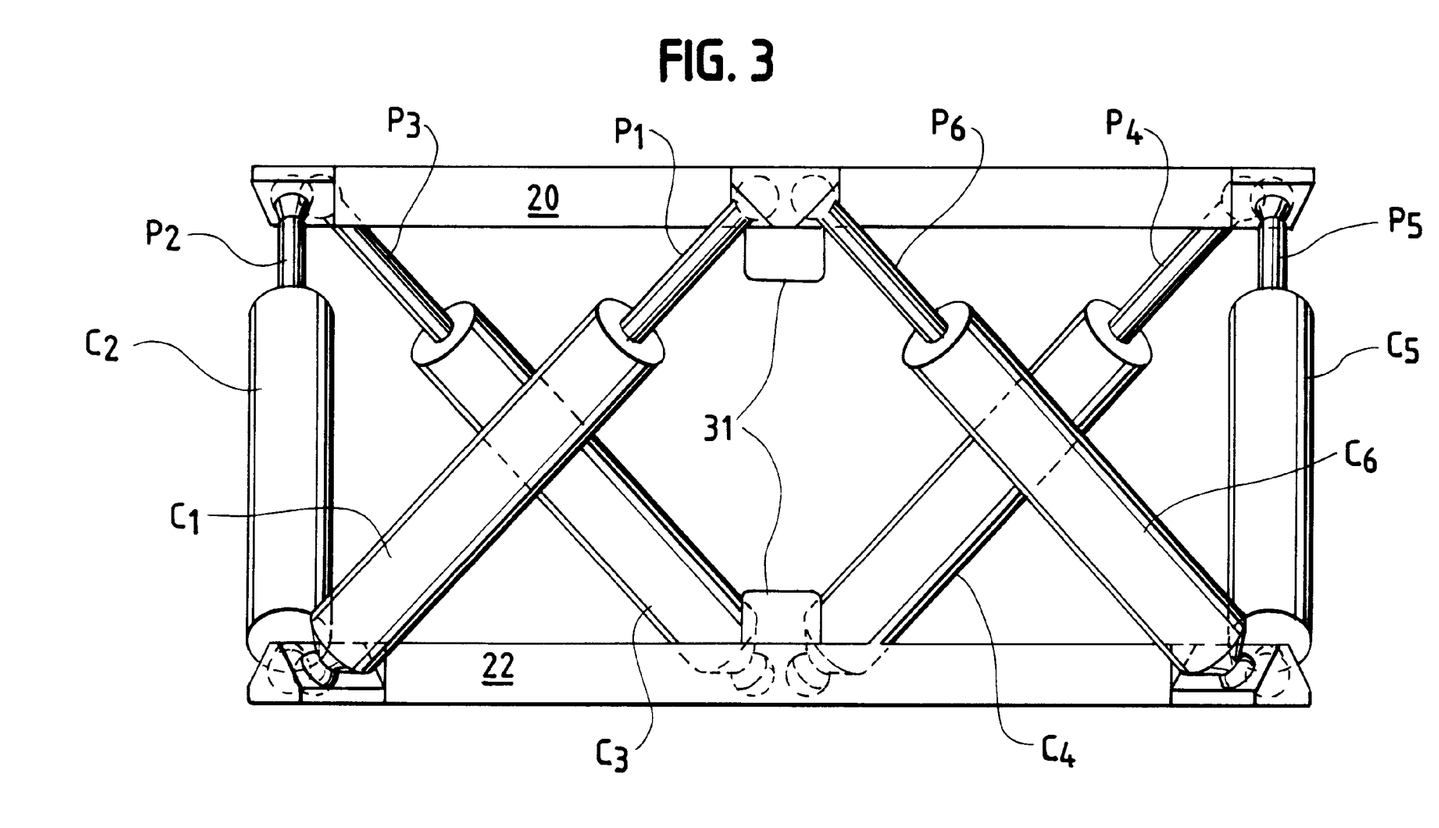
FIG. 3 is a partial front view of FIG. 1.

Referring now to FIGS. 1–3, the active suspension system of the present invention is designated generally as 10. Suspension system 10 includes a number of seat actuating members for moving the seat in any direction. In the preferred embodiment, six hydraulic cylinders C1–C6 are employed, and are positioned along segments AB, BC, CD, DE, EF, and FA, respectively. Top and bottom rigid, generally triangular mounting or support plates 20 and 22 are connected by cylinders C1–C6 to form a star-shaped geometry as viewed from above. Alternatively, mounting plates can be provided in any geometrical shape (such as hexagonal), provided that the mounting plates do not interfere with the cylinder movements. The six ends or apexes (apexes A–E) of support plates 20 and 22 are connected to each cylinder and its associated piston rod (P1–P6), as shown. Preferably the cylinders are of equal length, and the support plates are positioned parallel to each other.

Ball joint connections A1, A2, B1, B2, c1, c2, D1, D2, E1, E2, and F1, F2 are shown for pivotally attaching the cylinders C1–C6 to mounting plates 20 and 22. However, alternative connections could be used, such as flexible rubber joints or universal joints. Preferably, the joint connections utilized will provide adequate precision, since too much looseness in the joints can create resonance or increased noise problems.

The kinematic layout of the cylinders C1–C6 and mounting plates 20, 22 forms the basic mechanical and suspensional support for the vehicle seat, and also provides the mechanism by which seat movement is controllably adjusted in response to vehicle movement, as further explained below. The kinematic layout also permits the use of a low profile suspension system which may be (for example) approximately 10–12 inches in height or less.

Figure 8:
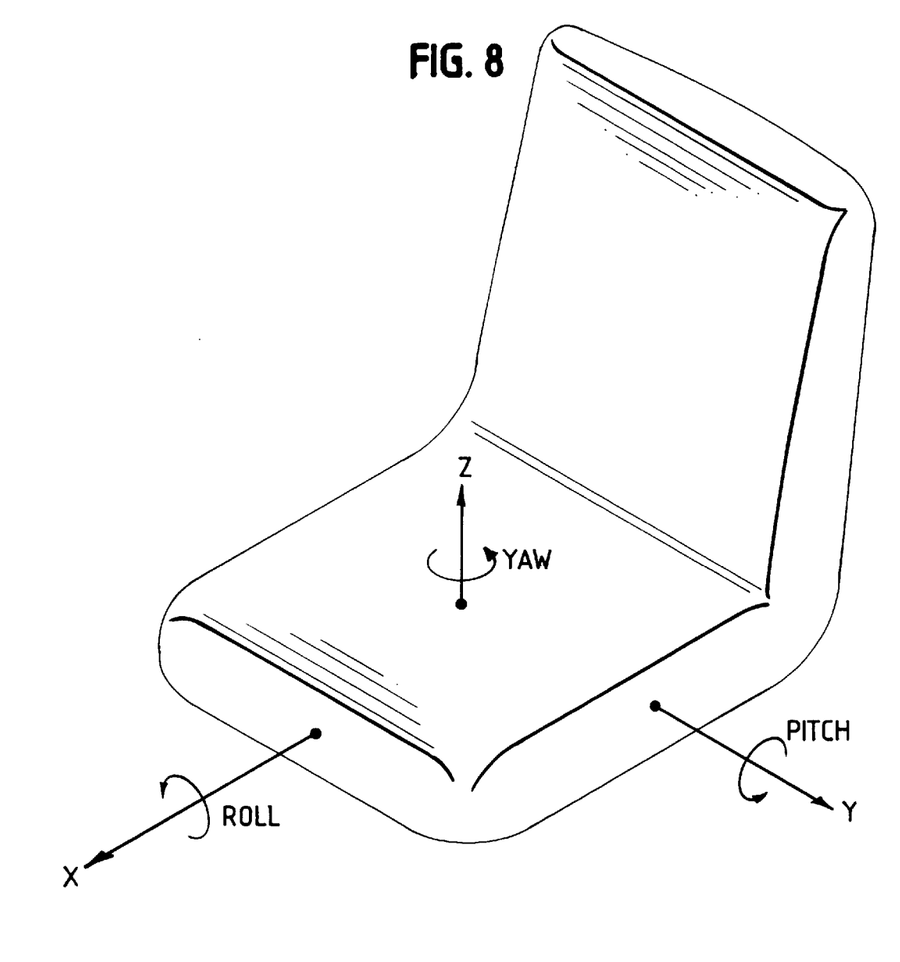
FIG. 8 is a schematic view illustrating the six possible directions of vehicle seat movement.

Referring now to FIG. 8, the possible directions of vehicle or seat movement are now defined. Thus, "vertical" movement is along the "z" axis or coordinate; "side-to-side" or "lateral" movement is along the "y" axis; "fore-and-aft" movement is along the "x" axis; "yaw" is rotational movement about the "z" axis; "pitch" is rotational movement about the "x" axis; and "roll" is rotational movement about the "x" axis. Each of these possible directions of vehicle seat movement are described in the claims as the different "aspects" of movement of the vehicle seat. Thus, all six cylinders C1–C6 will act in concert to accomplish seat movement in any of these six directions, as further explained below.

It will now be understood that desired movement of the vehicle seat can be accomplished by the simultaneous extension or retraction of designated cylinder rods. The use of six cylinders in the configuration shown will permit movement of the vehicle seat in any of six different directions to compensate for vehicle movement.

Figure 4:
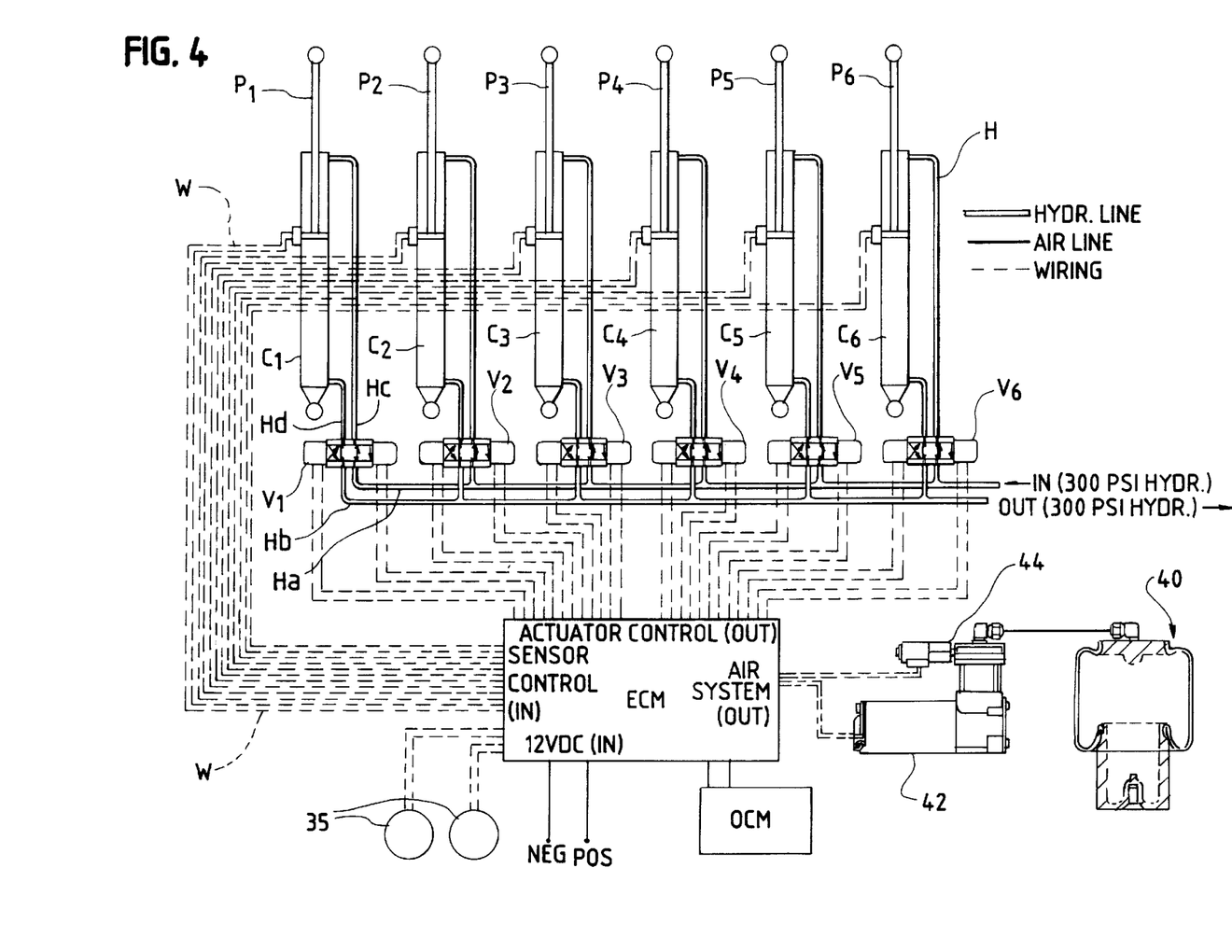
FIG. 4 is a schematic view of the electronic control module, valve assemblies and associated hydraulics and wiring for one embodiment of the present invention.
Figure 5:
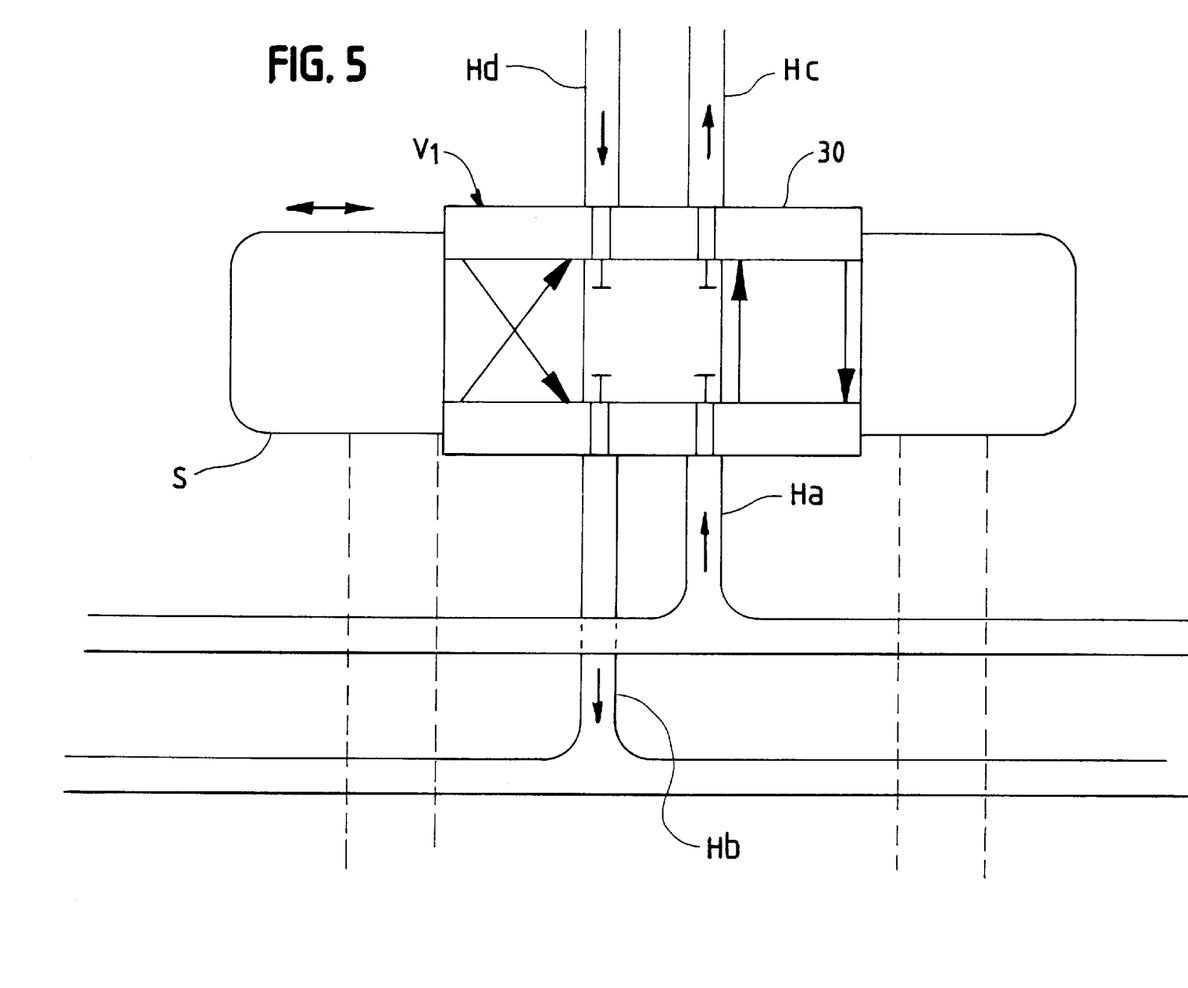
FIG. 5 is an enlarged schematic view of one of the valve assemblies (V1) and associated hydraulics, shown in FIG. 4.

Referring now to FIG. 4, each cylinder C1–C6 has a respective valve assembly V1–V6 associated with it. (As shown in the embodiment of FIG. 1, three valve clusters 70 house valves V1–V6.) Referring also to FIG. 5, valve mechanism 30 slides along solenoid S in the direction of the arrows. (Instead of a solenoid, a stepper or servo motor, or an alternate motion device can be used.) When valve 30 is in the position shown in FIG. 5, hydraulic fluid is permitted to flow through hydraulic line Ha and into hydraulic line Hc in the direction of the arrows, retracting piston rod P1 within cylinder C1. When valve 30 is displaced to the right (not shown), hydraulic fluid will run from line Ha to line Hd, causing piston rod P1 to extend. Of course, the valve assembly depicted in FIGS. 4 and 5 is exemplary only, and those of skill in the art will recognize that a variety of other valve assemblies and configurations can be employed.

Still referring to FIG. 4, an electronic control module (ECM), which can take the form of a high speed microprocessor (a 32-bit or 64-bit controller, for example), can be used to control the suspension system. The ECM is electrically connected to the Operator Control Module (OCM, which can include a keyboard and computer screen, for example), and to valve assemblies V1–V6, through the wiring W shown. Alternatively, while an electronic control system is the preferred embodiment, other types of control systems, such as pneumatic or mixed electronic and/or hydraulic or pneumatic controls, might also be used.

Position sensors 23 are also wired to the ECM, and are used to monitor cylinder rod movement so that the precise location of the cylinder rod with respect to each corresponding hydraulic cylinder can be monitored at all times. Voltage detectors can be used for this purpose, such that (for example) 1 volt would signal a fully retracted condition and 10 volts would signal a fully extended position, so that intermediate voltage levels would permit the location of each piston rod to be nearly precisely determined at any given point in time. In an alternative embodiment, position sensors of a different form could be used to monitor the precise amount of hydraulic fluid within each cylinder at any given time, thereby indirectly monitoring cylinder rod movement.

Movement sensors for monitoring movement of the vehicle and the vehicle seat are also connected to the ECM. Examples of sensors that could be used are linear variable displacement transducers 31 and/or triax accelerometers 35. As an example, six or more accelerometers (not shown) or, alternatively, two or more triax accelerometers 35 (which measure acceleration in three directions) can be used to vehicle and vehicle seat movement in six directions. These sensors can be mounted on the top of the vehicle seat, at its base, and at remote positions in the cab, to enable the active suspension system to react to vehicle movement.

In operation, as the vehicle encounters a bump, the vehicle and vehicle seat movement sensors provide feedback to the ECM concerning this movement. The ECM addresses a data file which stores and continuously updates the precise positions of each cylinder rod, based on feedback from the position sensors. Based on the updated data from the position sensors, the ECM sends electronic controls signals to valves V1–V6, actuating the hydraulic cylinders to move the vehicle seat in response to the bump, limiting or eliminating any vehicle seat movement perceived by the seated operator. Appropriate software can be designed to enable these operations to occur. Preferably, the software will trigger operator alarms if the position sensors indicate a cylinder malfunction, for example. In this event, the active suspension system can be shut down.

In addition to using position sensors to continuously sense and update the position of the seat actuating members (i.e., the hydraulic cylinders, in the preferred embodiment), a functioning active suspension system of the present invention can be provided if movement sensors are also used for monitoring the movements of either the vehicle or the vehicle seat. However, preferably movement sensors are provided for simultaneously monitoring both vehicle and vehicle seat movements, since this will result in the most accurate suspension system.

It will be appreciated that the active vehicle seat suspension system disclosed here can be modified to include the use of an air spring 40, together with an associated compressor 42 and valving 44, as shown in the drawings, to provide a secondary means for supporting the vehicle seat, if desired. As shown, the air spring can be centrally positioned between the base support and the seat and can aid in the support of the seating load, permitting the use of less powerful actuators. A portion of the air spring preferably is surrounded by an elastomeric sleeve 46 which will provide some support in horizontal directions as well. Alternatively, a mechanical (e.g. conical) spring can be used. Of course, if the hydraulic pressure in the cylinders is sufficient, no secondary support structure need be used.

It will now be understood that, unlike prior art vehicle seat suspension systems, dedicated single-axis seat actuating members are not employed. Rather, each of the seat actuating members (in the embodiment described in the drawings, the six hydraulic cylinders) move in concert and are involved in vehicle seat movement in any direction at any given point in time.

Additionally, again unlike prior art vehicle seat suspension systems, the need for a separate mechanical linkage to support the vehicle seat load (such as the commonly used parallelogram or scissors linkages) is removed. Thus, the suspension system of the present invention also serves as the "mechanical support" for the vehicle seat. As used here, the term "mechanical support" refers to a support which functions to position, support and align the seat mechanically with respect to the base. This function has been conventionally performed in the prior art by scissors or parallelogram linkages, and the like, such as disclosed in U.S. Pat. Nos. 4,709,896, 4,856,763, 4,943,037, and 5,125,631, the disclosures of which are hereby incorporated by reference. While not required, any of the mechanical support systems disclosed in those patents can be used in conjunction with the active suspension system of the present invention.

In an alternative embodiment, air cylinders can be substituted for the hydraulic cylinders. However, it will be recognized that if off-road or farm vehicles are used with the present invention, such vehicles typically employ a powerful hydraulic system which can be tapped to provide a ready source of power for a hydraulically-powered system may be preferable. (It will be understood that it is necessary to regulate down the vehicle hydraulic system from (for example) 2800 p.s.i. to a level which can be safely used within the cab and near an operator.)

In yet another alternative embodiment, electromagnetic actuators can be used instead of hydraulic cylinders. For example, high powered electromagnetic speaker coils can be used to selectively control the movement of metal actuator rods through magnetic induction.

In still another alternative embodiment, instead of hydraulic actuators, linear actuators (such as a motor and drive screw (e.g., ball screw)), or a high speed double helix wall screw powered by an individual high powered motor, can be used. In other alternative embodiments, servo-electronic or servo-hydraulic motors can also be used to power the seat actuating members.

Figure 6:
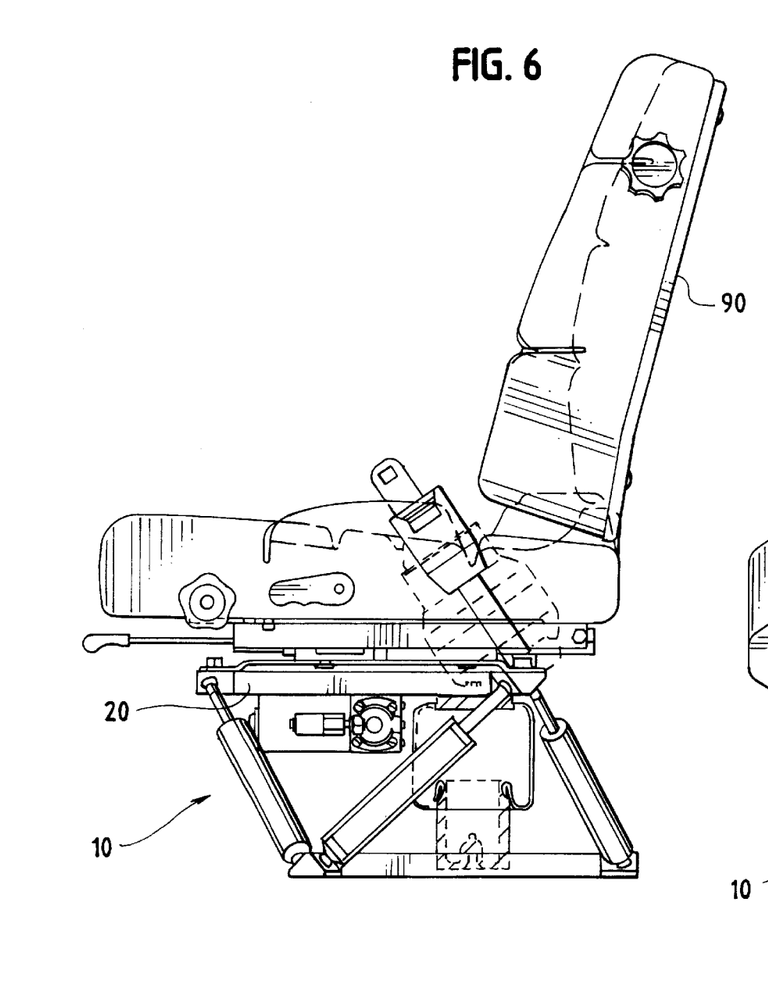
FIG. 6 is a side view similar to FIG. 2 of one embodiment of the active suspension system of the present invention shown mounting a vehicle seat.
Figure 7:
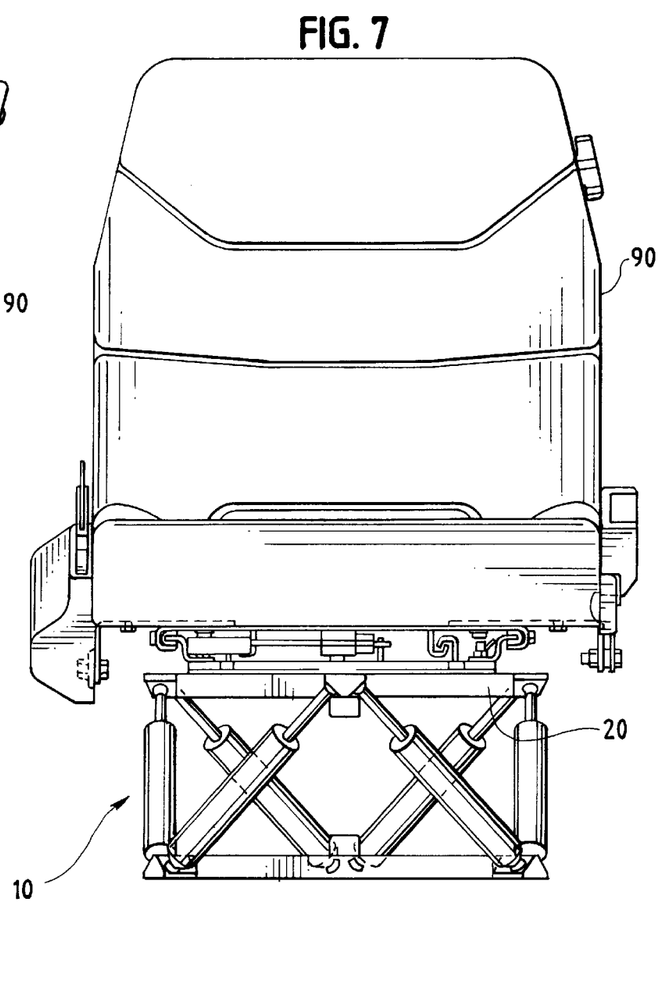
FIG. 7 is a front view, similar to FIG. 3, of the embodiment shown in FIG. 6.

FIGS. 6 and 7 show a vehicle seat 90 mounted to the active suspension system 10 of the present invention. As shown, top support plate 20 is rigidly connected to a lower portion of the vehicle seat.

In any suspension system there can be vehicle movements, such as severe drops, which cannot be compensated for by adequate movement of the seat, given the system limitations (e.g., the provision of a "low-profile" suspension system with a limited cylinder stroke length). Therefore, the ECM can be programmed to cease movement of the seat movement actuators when severe vehicle movement above certain ranges is encountered. Alternatively, if the "active" suspension system is disabled when extreme motion is encountered, the system can be designed to revert to a secondary passive system (such as the air spring embodiment discussed above) to provide the seated operator with as much protection from severe jolts and bumps as possible. In extreme conditions, the ECM can also be programmed to decelerate the cylinders as they reach their cushioned end stop, independent of sensor feedback. Should a cylinder fail, the ECM can be programmed to "shut down" the suspension system. Diagnostic systems or plugs can also be used to provide the operator with indications of any system problems as they occur.

It may also be desirable to modify the seat suspension system to facilitate entry or exit from the seat. Thus, for example, the ECM could be programmed so that when the operator leaves the seat, the seat will automatically swivel, easing entry when the seat is next used. When unused, the seat can also be placed in a locked position.

It will be appreciated by those skilled in the art that various modifications and changes can be made to the illustrated embodiments without departing from the spirit of the present invention. For example, the present invention can be modified to serve as the active suspension system for the cab of a vehicle. The resulting "suspended cab" will have the same advantages as the vehicle seat of the present invention. Of course, this "suspended cab" active suspension system embodiment can be used together with secondary mechanical support systems, such as air springs, as with the vehicle seat active suspension system embodiment disclosed above. All such modifications and changes are intended to be covered by the appended claims.

We claim:

1. A vehicle seat and active suspension assembly for limiting movement of the vehicle seat comprising:

a plurality of seat actuating members operatively associated with the vehicle seat, the actuating members being adapted to control two or more different aspects of movement of the seat with respect to a vehicle and to support a load applied to the seat;

sensors for monitoring movement of the vehicle and the seat actuating members, the sensors generating signals indicative of vehicle movement; and a control system to generate a counter movement of the seat actuating members in response to the sensor signals, producing seat movement relative to the vehicle and thereby limiting seat movement relative to the ground.

2. The assembly of claim 1, wherein the seat actuating members control vehicle seat movement in six directions.

3. The assembly of claim 1, wherein the seat actuating members also provide mechanical support for the vehicle seat.

4. The assembly of claim 3, further comprising one or more springs associated with the vehicle seat to aid the seat actuating members in mechanically supporting the vehicle seat.

5. The assembly of claim 1, wherein the seat actuating members provide the sole mechanical support for the vehicle seat.

6. The assembly of claim 1, wherein the the control system includes a controller electrically connected to the seat actuating member and to the sensors.

7. The assembly of claim 6, wherein the the controller includes a microprocessor.

8. The assembly of claim 6, wherein the controller is programmed so that when the operator leaves the seat, the seat will automatically rotate, easing entry when the seat is next used.

9. The assembly of claim 1, wherein the sensors for monitoring vehicle movement are positioned at remote locations from the sensors for monitoring vehicle seat movement.

10. The assembly of claim 1, wherein the seat actuating members comprise hydraulic cylinders.

11. The assembly of claim 10, further comprising valve mechanisms associated with the hydraulic cylinders and responsive to the control system, wherein control signals to the valve mechanisms operably control the hydraulic cylinders.

12. The assembly of claim 1, wherein the seat actuating members comprise six hydraulic cylinders connected to upper and lower rigid frames, and wherein the upper frame is rigidly connected to the vehicle seat.

13. The assembly of claim 1, wherein the seat actuating members include air cylinders.

14. The assembly of claim 1, wherein the seat actuating members comprise linear actuators including a motor and a plurality of drive screws.

15. The assembly of claim 1, wherein the seat actuating members are electromagnetically powered.

16. The assembly of claim 1, wherein the control system temporarily disables the seat actuating members and causes them to remain in predetermined positions when the vehicle encounters extreme movement conditions, as determined by the control system.

17. The assembly of claim 16, wherein during extreme movement conditions of the vehicle a secondary, passive vehicle seat support system is activated or continues to operate.

18. A vehicle seat and active suspension assembly for limiting movement of the vehicle seat in six directions comprising:

a plurality of seat actuating members operatively associated with the vehicle seat, the actuating members being adapted to control six different aspects of movement of the seat with respect to the vehicle and to support a load applied to the seat;

movement sensors for monitoring movement of the vehicle and the vehicle seat;

position sensors for monitoring movement of the seat actuating members; and a control system to generate a counter movement of the seat actuating members in response to feedback from the sensors, producing seat movement relative to the vehicle and thereby limiting seat movement relative to the ground.

19. The assembly of claim 18, wherein the movement sensors include linear variable displacement transducers.

20. The assembly of claim 18, wherein the movement sensors include accelerometers.

21. The assembly of claim 18, wherein the position sensors include voltage detectors.

22. A vehicle seat and low-profile, active suspension assembly for limiting movement of the vehicle seat comprising:

a plurality of seat actuating members operatively associated with the vehicle seat to control six different aspects of movement of the seat with respect to a vehicle, the seat actuating members also providing mechanical support for a load applied to the vehicle seat;

sensors for monitoring movement of the vehicle, the vehicle seat, and the seat actuating members, the sensors generating signals indicative of vehicle movement;

an electronic control system for directing a counter movement of the actuators in response to the sensor signals, in order to produce seat movement relative to the vehicle movement and thereby limit seat movement relative to the ground; and wherein the seat actuating members are positioned below the vehicle seat and the overall height of the suspension system is less than about one foot.

23. The seat assembly of claim 22, wherein the seat actuating members can move the vehicle seat in two or more directions.

24. The seat assembly of claim 22, wherein the seat actuating members can move the vehicle seat in any of six directions.

25. A vehicle seat and low-profile, active suspension assembly for limiting movement of the vehicle seat comprising:

a plurality of seat actuating members operatively associated with the vehicle seat, the seat actuating members being adapted to control two or more different aspects of movement of the seat with respect to a vehicle, the seat actuating members also functioning as a mechanical support for a load applied to the vehicle seat;

sensors for monitoring movement of the vehicle and the seat actuating members, the sensors generating signals indicative of vehicle movement;

a control system to generate a counter movement of the seat actuating members in response to the sensor signals, to produce seat movement relative to the vehicle and thereby limit seat movement relative to the ground; and wherein the seat actuating members are positioned below the vehicle seat and the overall height of the suspension system is about less than one foot.

26. A vehicle seat and active suspension assembly for limiting movement of the vehicle seat comprising:

a plurality of seat actuating members operatively associated with the vehicle seat, the actuating members being adapted to control six different aspects of movement of the seat with respect to a vehicle, and to support a load applied to the seat;

sensors for separately monitoring movement of the vehicle, the vehicle seat, and the seat actuating members, the sensors generating signals indicative of vehicle movement; and a control system to generate a counter movement of the seating actuating members in response to the sensor signals, in order to produce seat movement relative to the vehicle and thereby reduce seat movement relative to the ground.

27. A vehicle seat and active suspension assembly for limiting movement of the vehicle seat comprising:

a plurality of seat actuating members operatively associated with the vehicle seat, the seat actuating members adapted to control six different aspects of movement of the seat with respect to a vehicle, the seat actuating members also providing mechanical support for a load applied to the vehicle seat;

sensor means for monitoring movement of the vehicle and the seat actuating means, the sensor means generating signals indicative of vehicle movement; and an electronic control system to generate a counter movement of the seat actuating members in response to the sensor means signals, to produce seat movement relative to the vehicle and thereby limit seat movement relative to the ground.

28. A vehicle cab and active suspension assembly for limiting movement of the vehicle cab in six directions comprising:

a plurality of cab actuating members operatively associated with the vehicle cab, the actuating members being adapted to control six different aspects of movement of the cab with respect to the vehicle, the cab actuating members also providing mechanical support for a load applied to the vehicle cab;

a plurality of sensors for monitoring movement of the vehicle, the vehicle cab, and the cab actuating members, the sensors generating signals indicative of vehicle movement; and an electronic control system to generate a counter movement of the cab actuator members in response to the sensor signals, to produce cab movement relative to the vehicle and thereby reduce cab movement relative to the ground.

29. A method using a vehicle seat and active suspension assembly for limiting vehicle seat movement in response to movement of a vehicle on which the assembly is mounted, comprising the steps of:

providing a plurality of seat actuating members operatively associated with the vehicle seat, the seat actuating members being adapted to control six different aspects of movement of the seat with respect to the vehicle, the seat actuating members also providing mechanical support for a load applied to the vehicle seat;

providing a plurality of sensors for monitoring movement of the vehicle, the vehicle seat, and the seat actuating members, the sensors generating signals indicative of vehicle movement;

providing a control system in electrical communication with the sensors and the seat actuating members; and wherein the control system receives and processes the sensor signals, and responsively directs a counter movement of the seat actuating members to produce seat movement relative to the vehicle and thereby reduce seat movement relative to the ground.

30. A vehicle seat and active suspension assembly for limiting movement of the vehicle seat comprising:

six seat actuating members operatively associated with the vehicle seat, the actuating members being adapted to control six different aspects of movement of the seat with respect to the vehicle and to support a load applied to the seat;

at least two rigid upper and lower platforms for mounting the six seat actuating members;

sensors for monitoring movement of the vehicle and the seat actuating members, the sensors generating signals indicative of vehicle movement; and a control system to generate a counter movement of the seat actuating members in response to the sensor signals, producing seat movement relative to the vehicle and thereby reducing seat movement relative to the ground.

31. A vehicle seat and active suspension assembly for limiting movement of the vehicle seat comprising:

seat actuating members operatively associated with the vehicle seat, the actuating members adapted to control six different aspects of movement of the seat with respect to the vehicle and to support a load applied to the seat;

at least two rigid upper and lower platforms for mounting the seat actuating members, the upper and lower platforms being generally triangular-shaped;

sensors for monitoring movement of the vehicle and the seat actuating members, the sensors generating signals indicative of vehicle movement; and a control system to generate a counter movement of the seat actuating members in response to the sensor signals, producing seat movement relative to the vehicle and thereby reducing seat movement relative to the ground.

32. The assembly of claim 31, wherein at least one base of each of the generally triangular-shaped platforms is generally parallel to the other base.

33. The assembly of claim 31, wherein a base of one of the generally triangular-shaped platforms is generally perpendicular to the direction in which the vehicle seat is facing.

* * * * *